(12) United States Patent
Kim (10) Patent No.: US 9,124,161 B2
(45) Date of Patent: Sep. 1, 2015

(54) DOUBLE-STATOR/DOUBLE-ROTOR TYPE MOTOR AND DIRECT DRIVE APPARATUS FOR WASHER USING SAME

(75) Inventor: Byoung Soo Kim, Anyang-si (KR)

(73) Assignee: AMOTECH CO., LTD. (KR)

( * ) Notice: Subject to any disclaimer, the term of this patent is extended or adjusted under 35 U.S.C. 154(b) by 175 days.

(21) Appl. No.: 13/805,909

(22) PCT Filed: Jun. 14, 2011

(86) PCT No.: PCT/KR2011/004342
§ 371 (c)(1),
(2), (4) Date: Dec. 20, 2012

(87) PCT Pub. No.: WO2011/162500
PCT Pub. Date: Dec. 29, 2011

(65) Prior Publication Data
US 2013/0093275 A1   Apr. 18, 2013

(30) Foreign Application Priority Data
Jun. 23, 2010 (KR) .................. 10-2010-0059532

(51) Int. Cl.
*H02K 16/04* (2006.01)
*H02K 16/00* (2006.01)
(Continued)

(52) U.S. Cl.
CPC ............. *H02K 16/04* (2013.01); *H02K 16/00* (2013.01); *H02K 1/278* (2013.01); *H02K 1/2786* (2013.01); *H02K 7/085* (2013.01); *H02K 21/16* (2013.01); *H02K 21/22* (2013.01); *H02K 29/03* (2013.01)

(58) Field of Classification Search
CPC .................................................. H02K 16/04
USPC ................... 310/114, 156.36, 156.37, 156.15
See application file for complete search history.

(56) References Cited

U.S. PATENT DOCUMENTS 5,038,065 A * 8/1991 Matsubayashi et al. ...... 310/162
5,783,893 A * 7/1998 Dade et al. .................... 310/266
(Continued)

FOREIGN PATENT DOCUMENTS

JP        60219945        11/1985
JP        07213044         8/1995
(Continued)

OTHER PUBLICATIONS

International Search Report—PCT/KR2011/004342 dated Feb. 6, 2012.

*Primary Examiner* — Dang Le
(74) *Attorney, Agent, or Firm* — Cantor Colburn LLP (57) ABSTRACT

Provided are a double-stator/double-rotor type motor, in which a double rotor is disposed between an inner stator and an outer stator so as to face the inner stator and the outer stator and form a magnetic circuit with a shortened magnetic path with respect to each of the inner stator and the outer stator, to thereby promote efficiency of the motor, and in which magnets are mounted on inner and outer circumferential surfaces of a back yoke, and a direct drive apparatus for a washing machine using the double-stator/double-rotor type motor. The double-stator/double-rotor type motor includes: a rotor including a first permanent magnet mounted on an inner circumferential surface of a back yoke and a second permanent magnet mounted on an outer circumferential surface of the back yoke; an inner stator that faces the first permanent magnet with a first air gap, to generate a first magnetic field that rotates the rotor; and an outer stator that faces the second permanent magnet with a second air gap, to generate a second magnetic field that rotates the rotor.

5 Claims, 9 Drawing Sheets

(51) Int. Cl.
*H02K 1/27* (2006.01)
*H02K 29/03* (2006.01)
*H02K 21/22* (2006.01)
*H02K 7/08* (2006.01)
*H02K 21/16* (2006.01)

(56) References Cited

U.S. PATENT DOCUMENTS

| | | | |
|---|---|---|---|
| 7,911,110 B2 * | 3/2011 | Choi et al. | 310/266 |
| 2009/0091204 A1 * | 4/2009 | Koshiba et al. | 310/114 |

FOREIGN PATENT DOCUMENTS

| | | |
|---|---|---|
| JP | 2002369467 | 12/2002 |
| JP | 2007060828 | 3/2007 |
| KR | 1020040002349 | 1/2004 |
| KR | 100663641 | 12/2006 |
| KR | 1020080000666 | 1/2008 |
| KR | 1020080030667 | 4/2008 |
| KR | 1020080090713 | 10/2008 |
| KR | 1020080094274 | 10/2008 |

* cited by examiner

FIG. 1

PRIOR ART

DOUBLE-STATOR/DOUBLE-ROTOR TYPE MOTOR AND DIRECT DRIVE APPARATUS FOR WASHER USING SAME

TECHNICAL FIELD

The present invention relates to a double-stator/double-rotor type motor, and more particularly to a double-stator/double-rotor type motor, in which a double rotor is disposed between an inner stator and an outer stator so as to face the inner stator and the outer stator and form a magnetic circuit with a shortened magnetic path with respect to each of the inner stator and the outer stator, to thereby promote efficiency of the motor, and in which magnets are mounted on inner and outer circumferential surfaces of a back yoke, and a direct drive apparatus for a washing machine using the double-stator/double-rotor type motor.

BACKGROUND ART

A brushless direct-current (BLDC) motor may be classified into a core type (or a radial type) and a coreless type (or an axial type), each having a generally cup-shaped (cylindrical) structure, according to whether or not a stator core exists.

A BLDC motor of a core type structure may be classified into an inner magnet type including a cylindrical stator where coils are wound on a number of protrusions formed on the inner circumferential portion thereof in order to form an electronic magnet structure, and a rotor formed of a cylindrical permanent magnet, and an outer magnet type including a stator where coils are wound up and down on a number of protrusions formed on the outer circumferential portion thereof, and a rotor formed of a cylindrical permanent magnet on the outer portion of which multiple poles are magnetized.

In a conventional outer magnet type BLDC motor, a main path of a magnetic flux forms a magnetic circuit starting from a permanent magnet of a rotor and proceeding toward a stator via an air gap, and proceeding toward the permanent magnet again and in the direction of a yoke.

In a conventional inner magnet type BLDC motor, a plurality of T-shaped core portions on a stator core around which coils are wound, protrude inwards. Also, the inner side ends of the respective core portions form a circle of a predetermined diameter. Also, a rotor is mounted in an inner space of the inner magnet type BLDC motor in which a cylindrical permanent magnet including a rotational shaft is attached, or at the center of the inner magnet type BLDC motor in which a ring-shaped permanent magnet is attached to a cylindrical yoke including a rotational shaft. The inner magnet type BLDC motor rotates in the same manner as that of the outer magnet type BLDC motor.

The magnetic circuit in the above-described core type BLDC motor has a symmetrical structure in the radial direction around the rotational shaft. Accordingly, the core type BLDC motor has less axial vibration noise, and is appropriate for low-speed rotation. Also, since a portion occupied by an air gap with respect to the direction of the magnetic path is extremely small, a high magnetic flux density may be obtained even if a low performance magnet is used or the number of magnets is reduced. As a result, a big torque and a high efficiency may be obtained.

The present applicant proposed a BLDC motor having a single-stator/double-rotor structure in a radial core type in which a stator core may be configured in a full split type, in Korean Patent Laid-open Publication No. 2004-2349. In the Korean Patent Laid-open Publication No. 2004-2349, rotors are respectively disposed at the inner and outer sides of the stator core, to thus form a flow of a magnetic path by a permanent magnet and a yoke that are respectively placed at the inner and outer sides of the stator core. Accordingly, the stator core may be perfectly split, to thus greatly enhance productivity and output of the motor by the individual coil windings.

In addition, in the case of motors having a single-stator/double-rotor structure respectively disclosed in Korean Patent Laid-open Publication Nos. 2008-30667 and 2008-666, coils are toroidally wound on a yoke placed between inner and outer slots formed in an identical number, and thus a high fill factor may not be available, to accordingly limit an efficiency rise.

Figure 1:
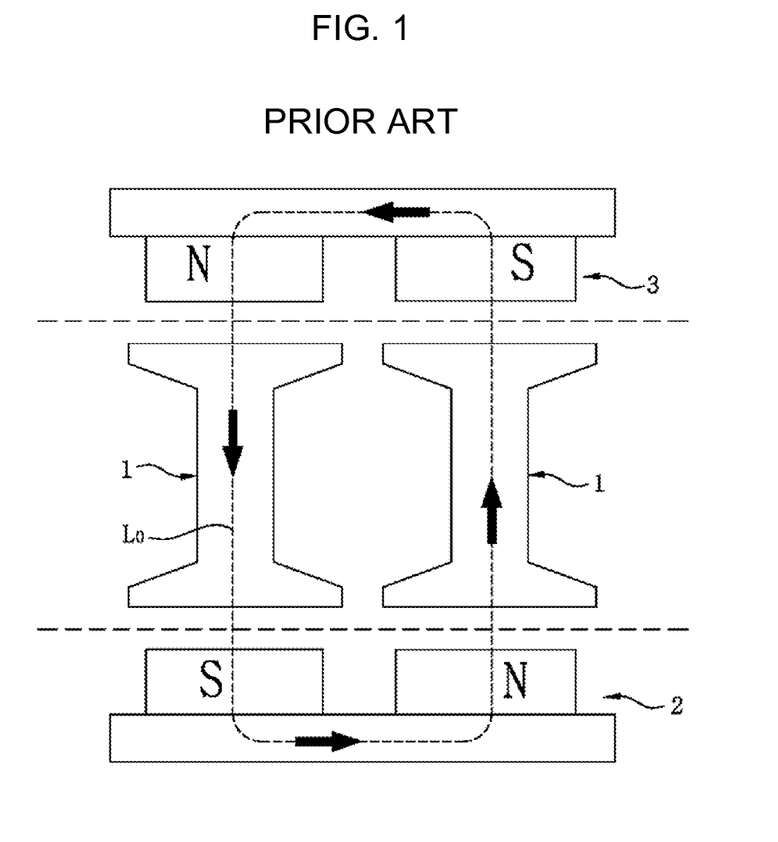
FIG. 1 is a cross-sectional view of a conventional split-core/double-rotor type motor.

Meanwhile, a conventional split-core/double-rotor type motor may be illustrated as shown in FIG. 1. FIG. 1 is a cross-sectional view of a conventional split-core/double-rotor type motor.

In the conventional split-core/double-rotor type motor illustrated in FIG. 1, a split type stator core (that is, a split-core) 1 is located between an inner rotor 2 and an outer rotor 3. The split-core/double-rotor type motor forms a magnetic circuit L0 in which the split type stator core 1 is opposed to the inner rotor 2 and the outer rotor 3 through a preset magnetic gap, respectively. Here, the magnetic circuit L0 forms a single path in which a magnetic flux passes through the split type stator core 1, the inner rotor 2, the split type stator core 1, and the outer rotor 3.

In general, the longer the path of the magnetic circuit may be, magnetoresistance may increase, and thus the loss of a magnetomotive force may become great. Accordingly, the conventional split-core/double-rotor type motor forms the magnetic circuit L0 in which a magnetic flux circulates between the inner rotor 2 and the outer rotor 3 with the split type stator core interposed between the inner rotor 2 and the outer rotor 3. Therefore, when compared with a single-rotor type structure, the conventional split-core/double-rotor type motor has large magnetoresistance to thus cause loss of a magnetomotive force and accordingly have an inefficient structure.

Thus, the conventional split-core/double-rotor type motor needs to reduce magnetoresistance by reducing the path of the magnetic circuit, to prevent the loss of the magnetomotive force.

Meanwhile, the Korean Patent Laid-Open Publication No. 2008-30667 disclosed a motor of a single-stator/double-rotor structure, in which a stator around the inwardly and outwardly protruding serrated saw-teeth of which coils are wound is combined with a double-rotor, to thus reduce cogging torque and torque ripples.

DISCLOSURE

Technical Problem

To solve the above problems or defects, it is an object of the present invention to provide a double-stator/double-rotor type motor, in which a double rotor is disposed between an inner stator and an outer stator so as to face the inner stator and the outer stator and form a magnetic circuit with a shortened magnetic path with respect to each of the inner stator and the outer stator, to thereby promote efficiency of the motor, and in which magnets are mounted on inner and outer circumferential surfaces of a back yoke, and a direct drive apparatus for a washing machine using the double-stator/double-rotor type motor.

It is another object of the present invention to provide a double-stator/double-rotor type motor, in which the number of slots for an inner stator and the number of slots for an outer stator are set differently from each other, to thus reduce cogging torque and torque ripples, and a direct drive apparatus for a washing machine using the double-stator/double-rotor type motor.

The objects of the present invention are not limited to the above-mentioned objects, and it will be appreciated that the non-described objects and advantages of the invention may be understood by the following description, and may be understood more clearly by the description of the embodiments of the present invention. It will be also easily appreciated that the objects and advantages of the invention may be implemented by elements presented in the patent claims and combinations thereof.

Technical Solution

To accomplish the above and other objects of the present invention, according to an aspect of the present invention, there is provided a double-stator/double-rotor type motor comprising: a rotor including a first permanent magnet mounted on an inner circumferential surface of a back yoke and a second permanent magnet mounted on an outer circumferential surface of the back yoke; an inner stator that faces the first permanent magnet with a first air gap, to generate a first magnetic field that rotates the rotor; and an outer stator that faces the second permanent magnet with a second air gap, to generate a second magnetic field that rotates the rotor.

Preferably but not necessarily, the rotor is placed between the inner stator and the outer stator, to thus form an independent magnetic circuit for each of the inner stator and the outer stator and to thereby perform a double-rotor function.

Preferably but not necessarily, the first and second permanent magnets of the rotor are disposed so that the magnets of an identical polarity face each other.

Preferably but not necessarily, protrusions are respectively formed on inner and outer circumferences of the back yoke in the rotor, to thus make one protrusion form a slot of a channel structure in cooperation with an adjacent protrusion, in which the first and second permanent magnets are insert and fixed into the slot in a sliding manner.

Preferably but not necessarily, the inner stator forms a plurality of outer T-shaped teeth that are protruded outwards from an annular body, and the outer stator forms a plurality of inner T-shaped teeth that are protruded inwards from the annular body, in which the number of the outer T-shaped teeth and opening angles thereof are formed differently from those of the inner T-shaped teeth, to thus minimize cogging torque and torque ripples, respectively.

Preferably but not necessarily, the inner stator and the outer stator have a split-core structure, respectively.

Preferably but not necessarily, the double-stator/double-rotor type motor is applied to a drum-type washing machine or a full-automatic washing machine, having an inner-rotor structure.

Preferably but not necessarily, the double-stator/double-rotor type motor is applied to a drum-type washing machine or full-automatic washing machine, having an outer-rotor structure.

According to another aspect of the present invention, there is also provided a direct drive apparatus for a drum-type washing machine in which the direct drive apparatus is provided for a tub to thus drive a basket, the direct drive apparatus comprising: a rotor including a first permanent magnet mounted on an inner circumferential surface of a back yoke and a second permanent magnet mounted on an outer circumferential surface of the back yoke; a stator unit including an inner stator that faces the first permanent magnet with a first air gap, to generate a first magnetic field that rotates the rotor, and an outer stator that faces the second permanent magnet with a second air gap, to generate a second magnetic field that rotates the rotor, to thereby drive the rotor rotatably; a rotating shaft whose outer circumference is supported to a central portion of the rotor and whose front end is combined with the basket; a first bearing that rotatably supports one end of the rotating shaft; and a second bearing that is provided in the tub to thus rotatably support the other end of the rotating shaft.

Preferably but not necessarily, the stator unit is mounted on the tub in a cover structure surrounding the rotor from outside.

Preferably but not necessarily, the first bearing is mounted on a central portion of the stator unit, or on the tub.

Preferably but not necessarily, the direct drive apparatus has an outer-rotor structure in which the stator unit is disposed on the outside of the tub, and the rotor is disposed on the outside of the stator unit.

Advantageous Effects

As described above, the present invention forms an independent dual magnetic circuit on both the inner and outer portions of a motor although the motor is a double-rotor type motor, thereby reducing a path of the magnetic circuit, and thus reducing magnetoresistance and loss of a magnetomotive force, and thereby minimizing leakage flux, and thus promoting motor efficiency to rise up.

In addition, the present invention provides an effect suitable for a large amount of output torque by increasing output torque of a rotor by a double-stator.

In addition, the present invention may be applied to an inner cylinder or a drum driving unit of a full-automatic washing machine or a cover-integrated type or a slim type drum-type washing machine.

In addition, the present invention uses a set of molds as inner and outer core molds, to thus reduce time and cost required for preparation of the mold.

BEST MODE

The objects, features and advantages of the invention will become apparent through the exemplary embodiments that are illustrated in the accompanying drawings and detailed in the following description. Accordingly, the inventive technological concept can be made by those skilled in the art without departing from the spirit and scope of the invention.

Prior to illustrating an embodiment of the present invention, a double-stator/double-rotor type motor according to the present invention is implemented into a case that a double-rotor is disposed between inner and outer stators.

Here, the double-stator/double-rotor type motor according to the present invention is configured to have a structure that an integral type rotor is disposed between inner and outer stators. However, since magnets are actually mounted on inner and outer portions of a back yoke in the rotor in order to form an independent magnetic circuit for each of the inner and outer stators, the double-stator/double-rotor type motor can provide a double-rotor function opposed to each of the inner and outer stators. The double-stator/double-rotor type motor makes a resultant force of output torque obtained from the inner and outer stators transferred to the rotor, and accordingly output torque of a rotating shaft connected with the rotor become large and is suitable for a high-capacity motor.

In general, a magnetic circuit of a motor increases magnetoresistance and leakage flux as a magnetic path becomes longer, and accordingly loss of a magnetomotive force becomes larger. However, the double-stator/double-rotor type motor according to the present invention forms an independent magnetic circuit for the respective inner and outer stators, to thereby prevent efficiency of a magnetomotive force from being lowered due to a lengthily formed magnetic path as a disadvantage of a double type motor (for example, a double-rotor type motor), as well as provide a large amount of output torque as an advantage of the double type motor.

Hereinbelow, the double-stator/double-rotor type motor according to the present invention will be described in detail with reference to the accompanying drawings.

Figure 2:
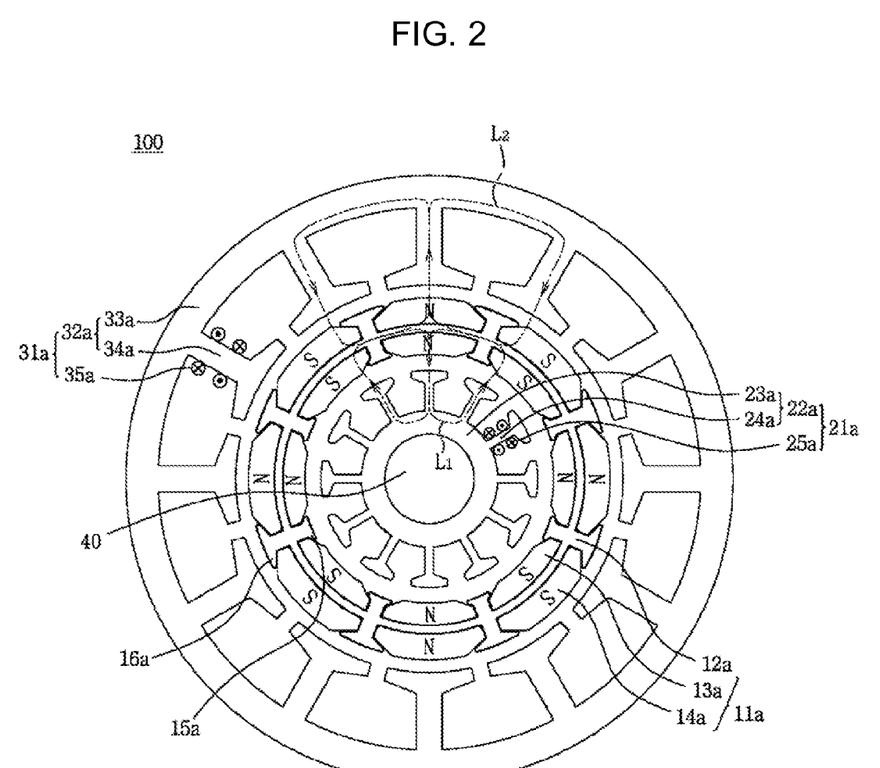
FIG. 2 is a cross-sectional view of a double-stator/double-rotor type motor according to a first embodiment of the present invention.

FIG. 2 is a cross-sectional view of a double-stator/double-rotor type motor according to a first embodiment of the present invention.

As shown in FIG. 2, the double-stator/double-rotor type motor 100 according to the first embodiment of the present invention includes a rotor 11a, an inner stator 21a, and an outer stator 31a, in which the rotor 11a is disposed between the inner stator 21a and the outer stator 31a. In this case, the inner stator 21a and the outer stator 31a cover the rotating rotor 11a to thus reduce vibration noise that occurs during rotation of the rotor 11a.

In addition, the inner stator 21a and the outer stator 31a are placed at the inner and outer sides of the rotor 11a, respectively, and an inner magnet 13a and an outer magnet 14a of an identical polarity are disposed on the inner and outer sides of the rotor 11a, respectively. When compared with a motor of a single-stator/single-rotor structure, the double-stator/double-rotor type motor 100 according to the first embodiment of the present invention offsets forces applied in the radial direction with respect the rotor 11a and acting in the counter-direction against each other, and thus generates less vibration to thus extend a lifetime of a bearing unit (not shown) supporting a rotating shaft 40.

One end of the rotor 11a is connected to the rotating shaft 40, and thus the rotor 11a rotates around the rotating shaft 40, and includes an annular back yoke 12a, an inner magnet 13a fitted between adjacent inner protrusions 15a formed on the inner circumference of the back yoke 12a, and an outer magnet 14a fitted between adjacent outer protrusions 16a formed on the outer circumference of the back yoke 12a.

In addition, the inner stator 21a includes an annular first body 23a, a plurality of first T-shaped teeth 24a that are protruded outwards from the first body 23a, and a plurality of first coils 25a wound on the first teeth 24a. Here, the first body 23a and the first teeth 24a will be collectively referred to as an "inner stator core 22a."

In addition, the outer stator 31a includes an annular second body 33a, a plurality of second T-shaped teeth 34a that are protruded outwards from the second body 33a, and a plurality of second coils 35a wound on the second teeth 34a. Here, the second body 33a and the second teeth 34a will be collectively referred to as an "outer stator core 32a."

In particular, the back yoke 12a of the rotor 11a, the inner stator core 22a of the inner stator 21a, and the outer stator core 32a of the outer stator 31a, may be molded by a set of core molds, to thus reduce the time and cost required for preparation of molds.

First, the rotor 11a performs a function as an inner rotor in opposition to the inner stator 21a, in which a plurality of inner magnets 13a composed of split pieces that are magnetized into an N-pole and an S-pole, respectively, are alternately disposed in the inside of the annular back yoke 12a, and performs a function as an outer rotor in opposition to the inner stator 21a, in which a plurality of outer magnets 14a composed of split pieces that are magnetized into an N-pole and an S-pole, respectively, are alternately disposed in the outside of the annular back yoke 12a. In this case, the inner and outer magnets 13a and 14a facing each other, are arranged to have an identical polarity. These inner and outer magnets 13a and 14a are magnetized into eight poles (pole pair=2).

As described above, even though the rotor 11a is an integrated rotor that is disposed between the inner stator 21a and the outer stator 31a, the rotor 11a performs independent rotor functions (for example, the inner and outer rotor functions) by the inner and outer magnets 13a and 14a that are disposed along the inner and outer circumferences of the rotor 11a. As a result, the rotor 11a performs a double rotor function with respect to the inner stator 21a and the outer stator 31a. This means that a sum of output torque generated by the inner stator 21a and the outer stator 31a acts as the output torque of the rotating shaft 40, since the rotor 11a actually performs a double rotor function even if the rotor 11a is configured into an integrated rotor.

Here, an inner magnetic circuit L1 is formed at the inner side of the motor 100 on the basis of the rotor 11a, in which an S-pole inner magnet 13a, an inner stator core 22a, an N-pole inner magnet 13a adjacent to the S-pole inner magnet 13a, and a back yoke 12a function as a path of a magnetic flux in the magnetic circuit L1. In addition, an outer magnetic circuit L2 is formed at the outer side of the motor 100 on the basis of the rotor 11a, in which an S-pole inner magnet 14a, an outer stator core 32a, an N-pole outer magnet 14a adjacent to the S-pole outer magnet 14a, and the back yoke 12a function as a path of a magnetic flux in the outer magnetic circuit L2.

In addition, an inner protrusion 15a and an outer protrusion 16a that are formed on the inner and outer circumferences of the back yoke 12a, respectively, form slots of channel structures in cooperation with adjacent inner and outer protrusions, in order to accommodate the inner magnet 13a and the outer magnet 14a, respectively. In addition, since the inner protrusion 15a and the outer protrusion 16a are formed on the inner and outer circumferences of the back yoke 12a, respectively, the sizes of the inner protrusion 15a and the outer protrusion 16a differ from each other, but the shapes thereof equal to each other in the form of a T-shaped tooth, the numbers thereof equal to each other, and the positions thereof are opposed to each other on the back yoke 12a. Accordingly, the inner magnet 13a and the outer magnet 14a are inserted and fixedly fitted into the slots formed on the back yoke 12a in a sliding manner.

Alternatively, the rotor 11a of the present invention may be configured into a structure that a ring-shaped magnet where an N-pole and an S-pole are divisionally magnetized may be disposed at the inner and outer sides of the back yoke 12a, instead of the above-described split piece magnet structure.

Here, an integral type stator core (for example, a whole-core) is described as the inner stator core 22a, but even a split type stator core (for example, a split-core) may be applied to the inner stator core 22a. In other words, in the case of the split type stator core, as disclosed in Korean Patent Registration Nos. 663641 or 930011, an annular integral type stator is obtained by integrally forming an insulating bobbin surrounding an inner split core, winding coils around the outer circumference of the bobbin so as to be assembled in an annular form, and molding the outer surface of the bobbin with a thermosetting resin by an insert molding method. A detailed description of the split type stator core will be omitted since those skilled in the art can easily understand the split type stator core. Also, in the case of employing the split type stator core structure, it is possible to maximize a fill factor and to perform alignment winding, to thus increase the efficiency of the motor.

A first coil 25a is an individual coil of three phases (such as U-phase, V-phase, and W-phase) respectively wound on first T-shaped teeth 24a, and wired in a three-phase star or three-phase delta wiring method. The first coil 25a is energized to thus generate torque by the relationship with the inner magnet 13a and to thereby make the rotor 11a rotate in a predetermined direction.

Additionally, copper (Cu) is typically used as a material of the first coil 25a, but aluminum (Al) with a specific weight of ⅓ and a relatively cheap price when compared with copper may be used as the material of the first coil 25a, to reduce the weight of the motor. In general, aluminum encounters an oxidation problem and thus it is difficult to apply aluminum to the motor coil, but when aluminum is used as the motor coil, the outside of a stator core assembly around which coils are wound is coated by using a thermosetting resin in order to solve the oxidation problem.

Similarly, an integral type stator core is described as the outer stator core 32a, but it even a split type stator core may be applied to as the outer stator core 32a.

In addition, a second coil 35a is an individual coil of three phases (such as U-phase, V-phase, and W-phase) respectively wound on second T-shaped teeth 34a, and wired in a three-phase star or three-phase delta wiring method. The second coil 35a is energized to thus generate torque by the relationship with the outer magnet 14a and to thereby make the rotor 11a rotate in a predetermined direction.

Here, for the convenience of description, the states where the first coil 25a and the second coil 35a are wound are not specifically shown in FIG. 2. That is to say, it is obvious that three-phase (U-phase, V-phase, and W-phase) coils are actually wound on the inner stator 21a and the outer stator 31a.

Figure 3:
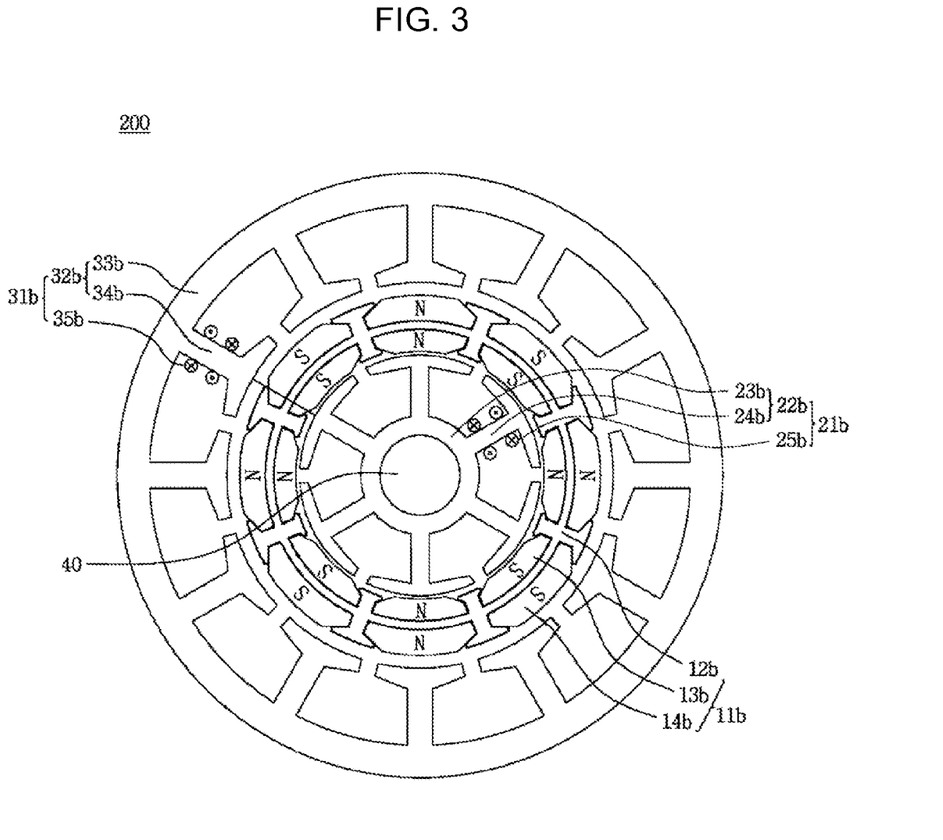
FIG. 3 is a cross-sectional view of a double-stator/double-rotor type motor according to a second embodiment of the present invention.

FIG. 3 is a cross-sectional view of a double-stator/double-rotor type motor according to a second embodiment of the present invention.

The double-stator/double-rotor type motor 200 according to the second embodiment of the present invention shown in FIG. 3, is a variant embodiment of the double-stator/double-rotor type motor 100 according to the first embodiment of the present invention, and includes the major components of the double-stator/double-rotor type motor 100 according to the first embodiment of the present invention.

In other words, the double-stator/double-rotor type motor 200 according to the second embodiment of the present invention includes a rotor 11b, an inner stator 21b, and an outer stator 31b. In addition, the rotor 11b includes a back yoke 12b, an inner magnet 13b, and an outer magnet 14b. The inner stator 21b includes a first body 23b, first T-shaped teeth 24b, and a first coil 25b, and the outer stator 31b includes a second body 33b, second T-shaped teeth 34b, and a second coil 35b. In this case, the first body 23b, and the first T-shaped teeth 24b are collectively referred to as an inner stator core 22b and the second body 33b and the second T-shaped teeth 34b are collectively referred to as an outer stator core 32a. A detailed description of the inner stator core 22b and the outer stator core 32a will be omitted since the inner stator core 22b and the outer stator core 32a correspond to those of the double-stator/double-rotor type motor 100 according to the first embodiment of the present invention.

However, the structure of the inner stator 21b in the double-stator/double-rotor type motor 200 according to the second embodiment of the present invention differs from that of the double-stator/double-rotor type motor 100 according to the first embodiment of the present invention. In other words, the number of the first T-shaped teeth 24a according to the first embodiment of the present invention is two times as that of the first T-shaped teeth 24b according to the second embodiment of the present invention. The first T-shaped tooth 24a according to the first embodiment has an opening angle narrower than the first T-shaped tooth 24b according to the second embodiment. Here, the opening angle means an angle where two lines that pass through both ends of the stator tooth make with respect to the center of the rotating shaft 40, and represents an electrical angle not a mechanical angle.

In particular, in the case of the double-stator/double-rotor type motor 100 according to the first embodiment of the present invention, opening angles for the first T-shaped tooth 24a of the inner stator 21a and the second T-shaped tooth 34a of the outer stator 31a, so that phases are inversed for each of the cogging torque and torque ripple existing between the rotor 11a and the inner stator 21a or between the rotor 11a and the outer stator 31a, to thus maintain a high torque constant (that is, average torque) and minimize overall cogging torque and torque ripple. Here, the opening angle of the first T-shaped tooth 24a is an angle where two lines that pass through both ends of the first T-shaped tooth 24a make with respect to the center of the rotating shaft 40, and the opening angle of the second T-shaped tooth 34a is an angle where two lines that pass through both ends of the second T-shaped tooth 34a make with respect to the center of the rotating shaft 40.

More specifically, in the present invention, the phase of the second cogging torque that exists between the rotor 11a and the outer stator 31a is inversed with respect to the phase of the first cogging torque that exists between the rotor 11a and the inner stator 21a. In addition, in the present invention, the phase of the second torque ripple that exists between the rotor 11a and the outer stator 31a is inversed with respect to the phase of the first torque ripple that exists between the rotor 11a and the inner stator 21a. As an example, cogging torque (see FIG. 4A) and torque ripple (see FIG. 4B) of the inner stator 21a and the outer stator 31a with respect to the rotor 11a have points of inflection at which phases change with respect to ranges "A" and "B" and consist of a sinusoidal waveform having maximum and minimum points.

Figure 4A:
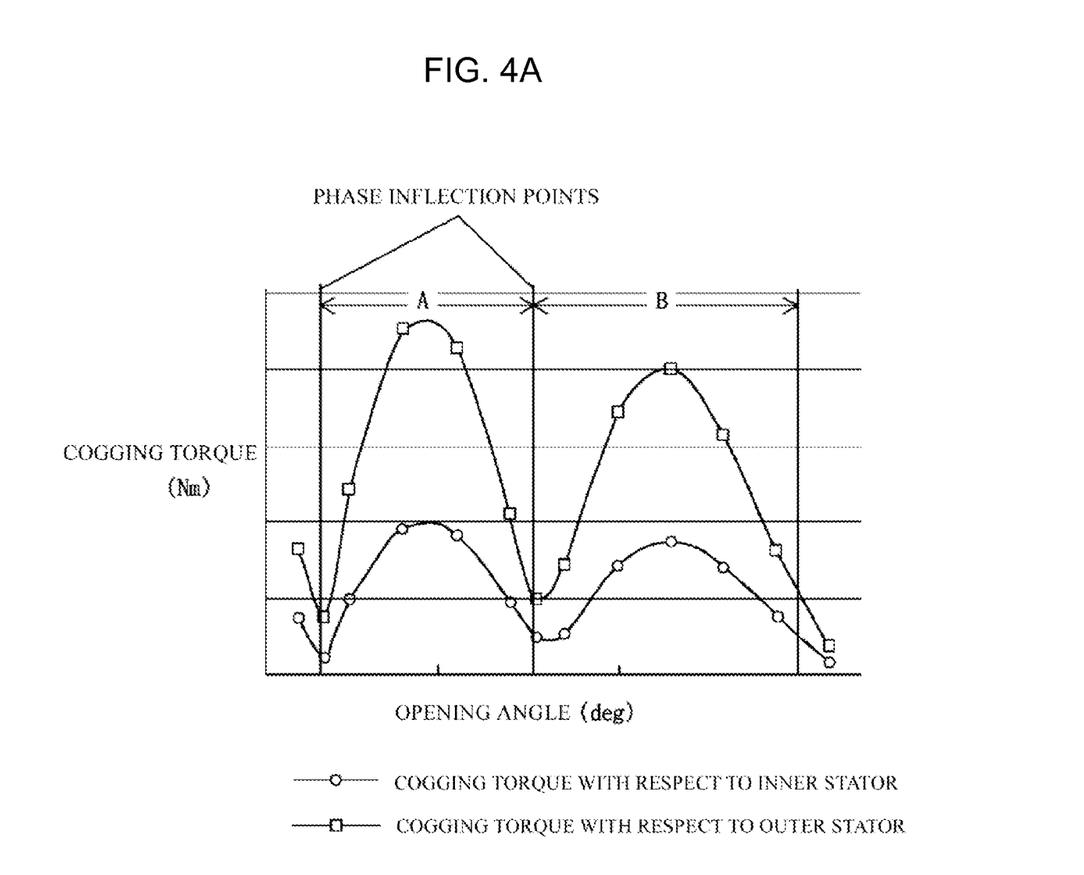
FIG. 4A is a graphical view showing a period of cogging torque for inner and outer stators of a rotor.
Figure 4B:
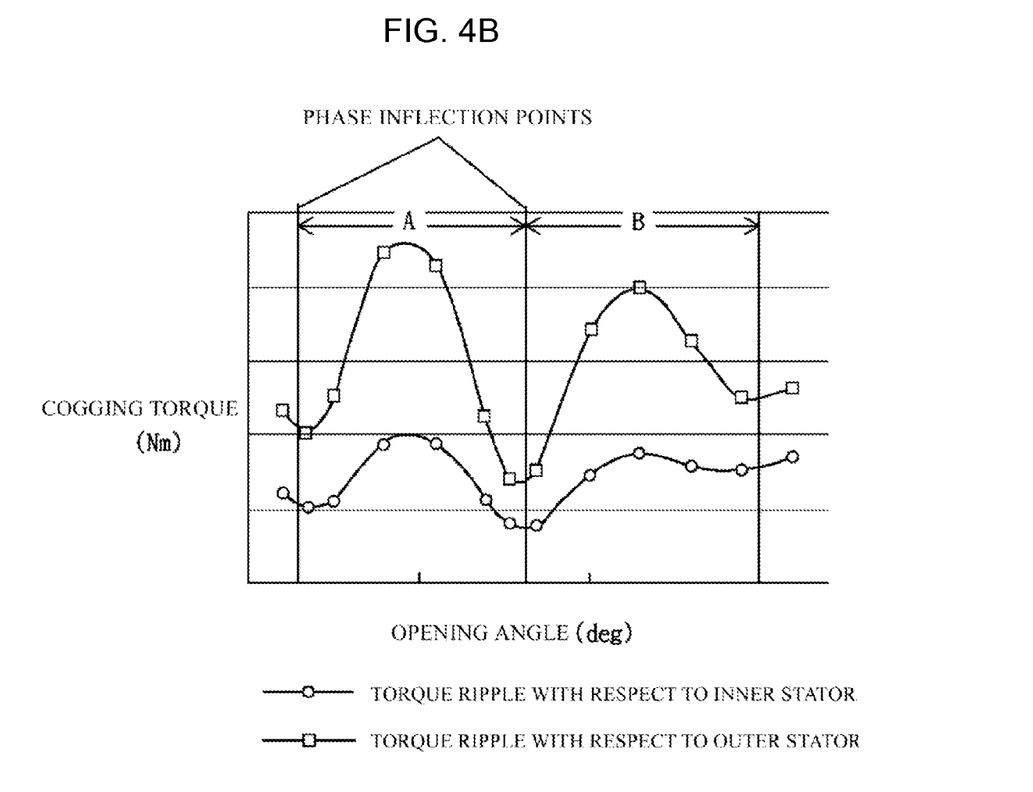
FIG. 4B is a graphical view showing a period of a torque ripple for the inner and outer stators of the rotor.

FIG. 4A is a graphical view showing a period of cogging torque for inner and outer stators 21a and 31a of a rotor 11a. FIG. 4B is a graphical view showing a period of a torque ripple for the inner and outer stators 21a and 31a of the rotor 11a.

Here, in order to minimize the overall cogging torque and torque ripple, opening angles for the first T-shaped tooth 24a of the inner stator 21a and the second T-shaped tooth 34a of the outer stator 31a are selected at points in place where phases are inverted within the range of amplitude as small as possible. In addition, the opening angle is selected so that a torque constant (that is, average torque) corresponds to a value within the high range. This is to reduce the overall cogging torque and torque ripple while improving output torque.

Similarly, in the case of the double-stator/double-rotor type motor 200 according to the second embodiment of the present invention, opening angles for the first T-shaped tooth 24b and the second T-shaped tooth 34b according to the second embodiment are selected in the same manner as those for the first T-shaped tooth 24a and the second T-shaped tooth 34a according to the first embodiment are selected.

Meanwhile, as described above, the structure of the inner stator 21b in the double-stator/double-rotor type motor 200 according to the second embodiment of the present invention differs from that of the inner stator 21a in the double-stator/double-rotor type motor 100 according to the first embodiment of the present invention. This is to easily convert periods of cogging torque and torque ripple between the rotor 21b and the inner stator 21b according to the second embodiment. Thus, the respective double-stator/double-rotor type motors 100 and 200 according to the first and second embodiments of the present invention may reduce the overall cogging torque and torque ripple.

Meanwhile, the respective double-stator/double-rotor type motors 100 and 200 according to the first and second embodiments of the present invention may be applied to full-automatic washing machines as well as drum-type washing machines, but only the case that the present invention is applied to the drum-type washing machine will be described in detail (see FIGS. 5 to 8). However, in the case that the respective double-stator/double-rotor type motors 100 and 200 according to the first and second embodiments of the present invention are applied to the full-automatic washing machine, the upper end of the rotating shaft is connected with an inner cylinder corresponding to a basket of the drum-type washing machine, and the support portion of the stator is connected with an outer cylinder corresponding to a tub of the drum-type washing machine.

The respective double-stator/double-rotor type motors 100 and 200 according to the first and second embodiments of the present invention may be driven by applying electric power to both stators during performing laundry requiring high torque, and may be driven by applying electric power to one of stators during performing dehydration that requires high-speed rotation. In particular, only one stator may be driven during performing dehydration, to thus reduce power consumption. In this case, it is not necessary to perform a field weakening control, to thus enhance efficiency.

In addition, the respective double-stator/double-rotor type motors 100 and 200 according to the first and second embodiments of the present invention differ from each other in view of the numbers of the first T-shaped teeth 24a and 24b of the inner stators 21a and 21b, but may be identically described in a direct drive apparatus that is applied to the drum-type washing machine. Accordingly, for the convenience of description, only the double-stator/double-rotor type motor 100 according to the first embodiment of the present invention will be described below.

Hereinbelow, a direct drive apparatus for a drum-type washing machine will be described in detail with reference to FIGS. 5 to 8, in which the direct drive apparatus is provided in a tub of the drum-type washing machine to drive a basket.

Figure 5:
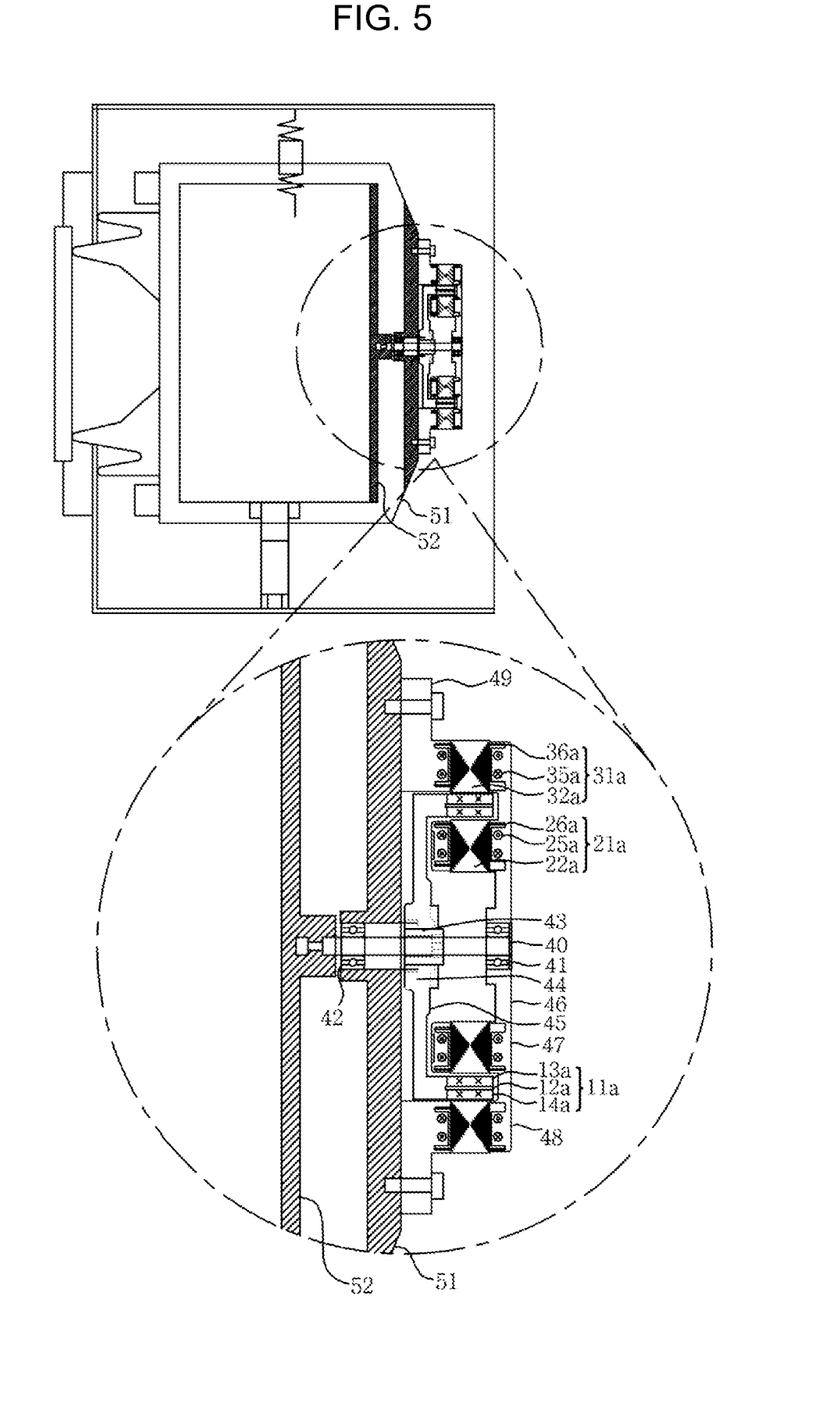
FIG. 5 is an axial cross-sectional view showing a double-stator/double-rotor type motor of a cover integrated structure applied to a drum-type washing machine, according to an embodiment of the present invention.

FIG. 5 is an axial cross-sectional view showing a double-stator/double-rotor type motor of a cover integrated structure applied to a drum-type washing machine, according to an embodiment of the present invention.

The respective double-stator/double-rotor type motors 100 and 200 according to the first and second embodiments of the present invention, employ a cover integrated structure as an inner-rotor structure (or an outer-stator structure) in which the rotor 11a is disposed at the inner side (that is, at the side of a tub of the drum-type washing machine) with respect to the inner stator 21a and the outer stator 31a in the axial cross-section, and represent a structure of blocking noise of the rotor that rotates in the inside of the motor.

The respective double-stator/double-rotor type motors 100 and 200 according to the first and second embodiments of the present invention, may be disposed on a rear surface of a tub 51 in a built-in type small-size or medium-size drum-type washing machine, as an example, and used to rotationally drive a basket 52 that is located in direct connection in the inside of the tub 51 in a forward/reverse direction. Also, the respective double-stator/double-rotor type motors 100 and 200 according to the first and second embodiments of the present invention may be applied to other equipment other than the washing machines. As described above, for the convenience of description, the drum-type washing machine will be described below with reference to the reference numerals of the double-stator/double-rotor type motor 100 according to the first embodiment of the present invention.

Hereinbelow, the drum-type washing machine employing the double-stator/double-rotor type motor according to the present invention will be described in detail.

As shown in FIG. 5. the rotor 11a has a predetermined magnetic gap with respect to an inner stator 21a and an outer stator 31a and a number of inner magnets 13a and outer magnets 14a are disposed in an annular form in the inside and outside of the back yoke 12a. Here, the rotor 11a is connected to a rotor support 45, and combined with a bushing 43 by a bushing support 44 that is extended to the rotor support 45, to accordingly transfer a rotating force to the rotating shaft 40.

In this case, the rotating shaft 40 becomes a reference that the rotor 11a, the inner stator 21a and the outer stator 31a may be assembled in one. Accordingly, the rotor 11a may prevent vibration noise due to the non-uniform magnetic gap during rotation, by uniformly setting a magnetic gap between the inner stator 21a and the outer stator 31a.

The rotating shaft 40 is combined with the rotor 11a through an involute serration bushing 43 in the center of the rotor 11a, and one end of the rotating shaft 40 is rotatably supported through a first bearing 41 that is integrally installed in an inner extension portion 46, and the other end of the rotating shaft 40 is rotatably supported through a second bearing 42 that is integrally installed in the tub 51.

In addition, the basket 52 that is rotatably supported in the inside of the tub 51 of the washing machine and that accommodates laundry washes is combined on the leading end of the rotating shaft 40, and thus the basket 52 is rotationally driven in a forward/reverse direction depending on the behavior of the motor 100.

The inner stator 21a is molded in an annular form by integrally combining an inner stator core 22a with an annular inner stator support 47, and the outer stator 31*a* is molded in an annular form by integrally combining an outer stator core 32*a* with an annular outer stator support 48. Here, the inner and the outer stator supports 47 and 48 are combined with the first bearing 41 through an inner extension portion 46 that is extended inwards from the inner and the outer stator supports 47 and 48. As described above, the rotating shaft 40 is rotatably supported by the first bearing 41.

In addition, the inner stator core 24*a* is integrally formed by the inner stator support 47 that is manufactured by winding a first coil 25*a* on the outer circumference of a first bobbin 26*a* and then insert molding the coil-wound first bobbin using a thermosetting resin, and the outer stator core 34*a* is integrally formed by the outer stator support 48 that is manufactured by winding a second coil 35*a* on the outer circumference of a second bobbin 36*a* and then insert molding the coil-wound second bobbin using a thermosetting resin.

In particular, the outer circumferential portion of the outer stator support 48 is extended forward and is fixed on the tub 51 of the washing machine by an outer extension portion 49 forming an annular cover. As described above, the stator in which the inner stator 21*a* and the outer stator 31*a* are integrally connected according to the present invention does not have any additional cover and thus may be formed in a slim structure, to thereby promote a low noise structure desirable for a built-in type washing machine.

Figure 6:
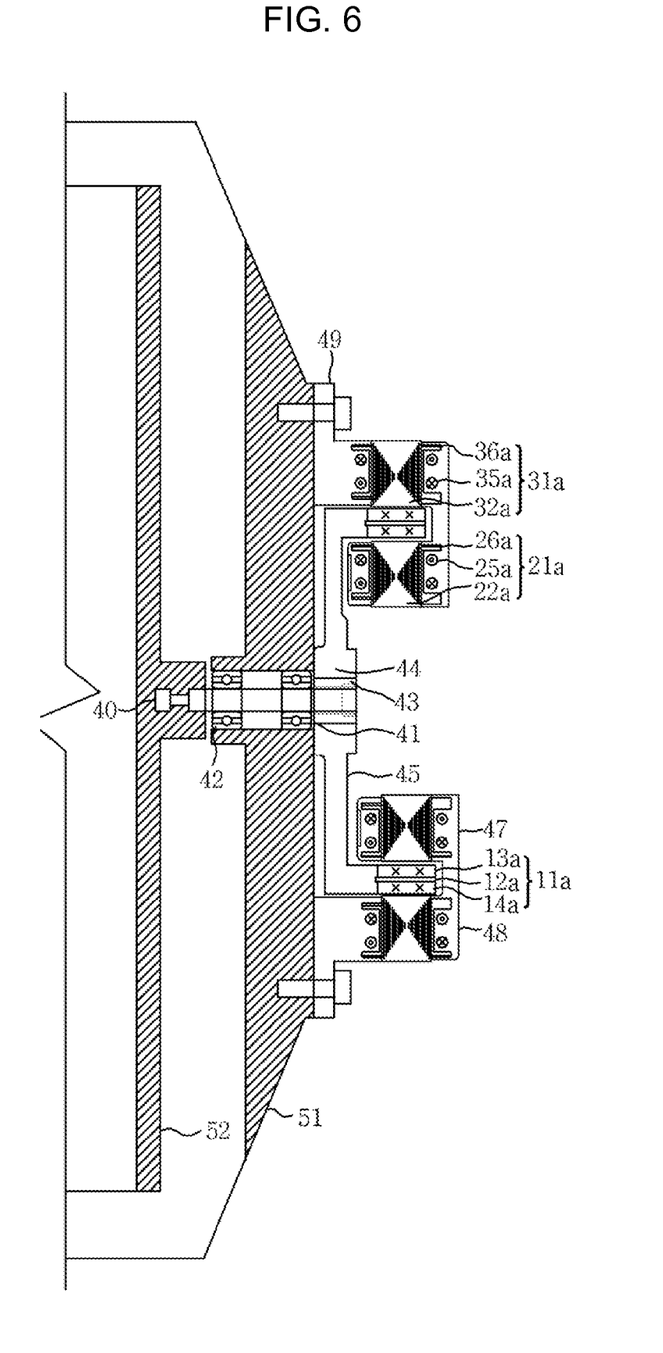
FIG. 6 is an axial cross-sectional view showing a double-stator/double-rotor type motor of a cover integrated structure applied to a drum-type washing machine, according to a modified embodiment of the present invention.

FIG. 6 is an axial cross-sectional view showing a double-stator/double-rotor type motor of a cover integrated structure applied to a drum-type washing machine, according to a modified embodiment of the present invention.

The double-stator/double-rotor type motor 100 shown in FIG. 6 is a kind of a cover integrated structure as an inner-rotor structure (or an outer-stator structure) in which the rotor 11*a* is disposed at the inner side of the motor as shown in FIG. 5, but has an open type structure in which both a first bearing 41 and a second bearing 42 are placed in the tub 51 to thus rotatably support the rotating shaft 40, and the inner extension portion 46 extended from the stator supports 47 and 48 is removed, to thus confirm the behavior of the rotor support 45 externally. This enables the behavior of the rotor support 45 to be confirmed externally and thus the state of the rotor 11*a* to be confirmed although the rotor 11*a* is located in the inside of the motor as an outer-stator structure.

Meanwhile, the detailed description of the rotor 11*a*, the inner stator 21*a*, and the outer stator 31*a* are redundant from the foregoing description of FIG. 5 and thus will be briefly described. In other words, a number of inner magnets 13*a* and outer magnets 14*a* are disposed in an annular form in the inside and outside of the back yoke 12*a* of the rotor 11*a*. The rotor 11*a* is supported and rotated by the rotor support 45 connected to the rotating shaft 40. The inner stator 21*a* is molded in an annular form by integrally combining an inner stator core 22*a* where a first coil 25*a* is wound on the outer circumference of a first bobbin 26*a* with an inner stator support 47, and the outer stator 31*a* is molded in an annular form by integrally combining an outer stator core 32*a* where a second coil 35*a* is wound on the outer circumference of a second bobbin 36*a* with an outer stator support 48.

Figure 7:
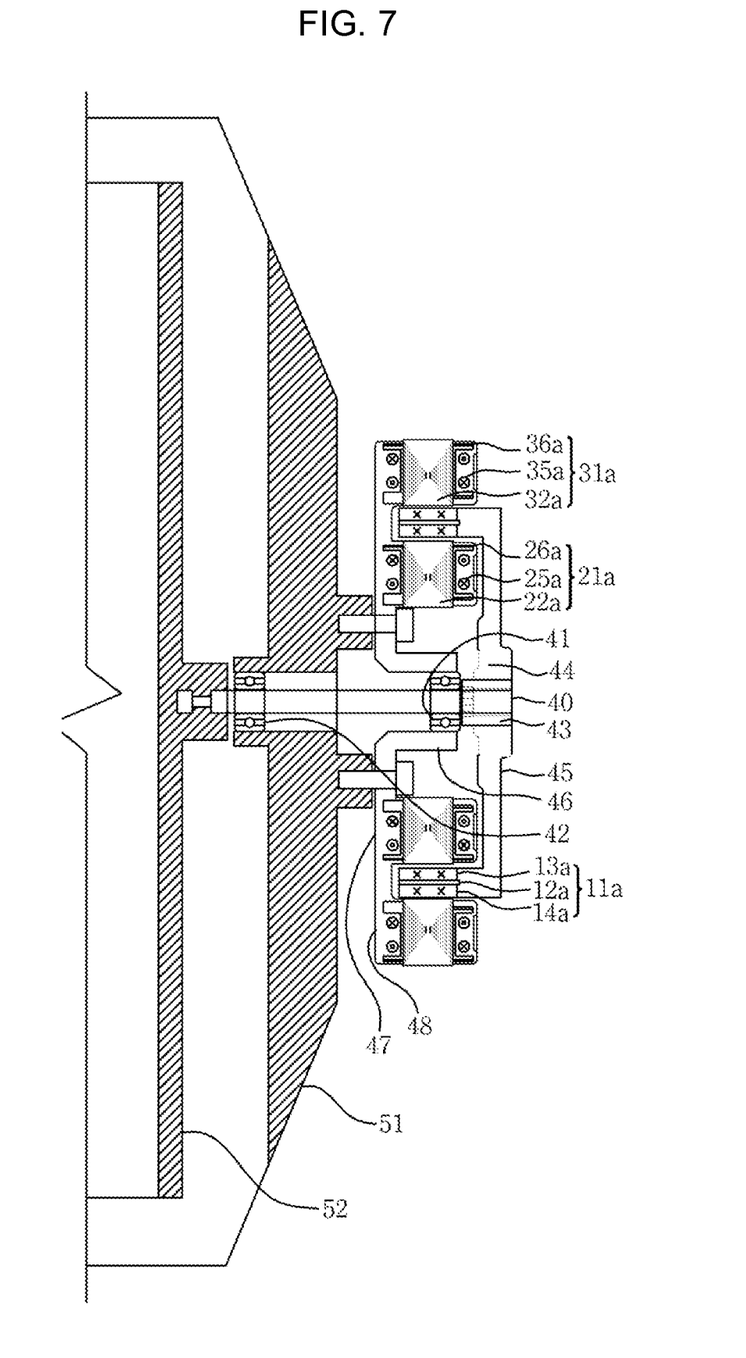
FIG. 7 is an axial cross-sectional view showing a double-stator/double-rotor type motor of a slim type structure applied to a drum-type washing machine, according to an embodiment of the present invention.

FIG. 7 is an axial cross-sectional view showing a double-stator/double-rotor type motor of a slim type structure applied to a drum-type washing machine, according to an embodiment of the present invention.

The respective double-stator/double-rotor type motors 100 and 200 according to the first and second embodiments of the present invention, employ a slim type structure as an outer-rotor structure (or an inner-stator structure) in which the rotor 11*a* is disposed at the outer side (that is, at the opposite side of the tub of the drum-type washing machine) with respect to the inner stator 21*a* and the outer stator 31*a* in the axial cross-section. As described above, for the convenience of description, the drum-type washing machine will be described below with reference to the reference numerals of the double-stator/double-rotor type motor 100 according to the first embodiment of the present invention.

As shown in FIG. 7, the double-stator/double-rotor type motor 100 according to the first embodiment of the present invention has a slim type structure, in which a bushing 43 that is combined with the rotating shaft 40, and an inner extension portion 46 that is coupled to the tub 51 are disposed at the central portion of the motor, to thus minimize and shorten the axial length (that is, the thickness) of the motor, and minimize vibration generated during rotation of the rotor 11*a*. In other words, the inner extension portion 46 is bent once inwardly and extended, in order to block the axial length of the motor from increasing, and accordingly is disposed in the coaxial direction with respect to the bushing 43 whose leading end is combined with the rotating shaft 40 of the rotor 11*a*.

Moreover, the double-stator/double-rotor type motor 100 according to the first embodiment of the outer-rotor structure may undergo stress-induced deformation and damage since the tub 51 is forced by the electromagnetic force when the power is applied to the motor in the case that the inner extension portion 46 is tightened with the tub 51 by using bolts. However, a first bearing 41 and a second bearing 42 may support the rotating shaft 40, to thus reduce deformation and damage due to the force applied to the tub 51 and may prevent distortion to thus disperse and support loads that may occur during rotation.

In addition, the double-stator/double-rotor type motor 100 may enhance the structural stability and increase durability against vibration of the washing machine, in which the first bearing 41 is placed in the inner extension portion 46 and the second bearing 42 is placed in the tub 51, to thus be spaced by a predetermined interval between the first bearings 41 and the second bearing 42. This means that the drum-type washing machine or the full-automatic washing machine may be implemented appropriately for the low vibration and low noise structure.

Here, the detailed description of the rotor 11*a*, the inner stator 21*a*, and the outer stator 31*a* are redundant from the foregoing description of FIGS. 5 and 6, and thus will be omitted.

Figure 8:
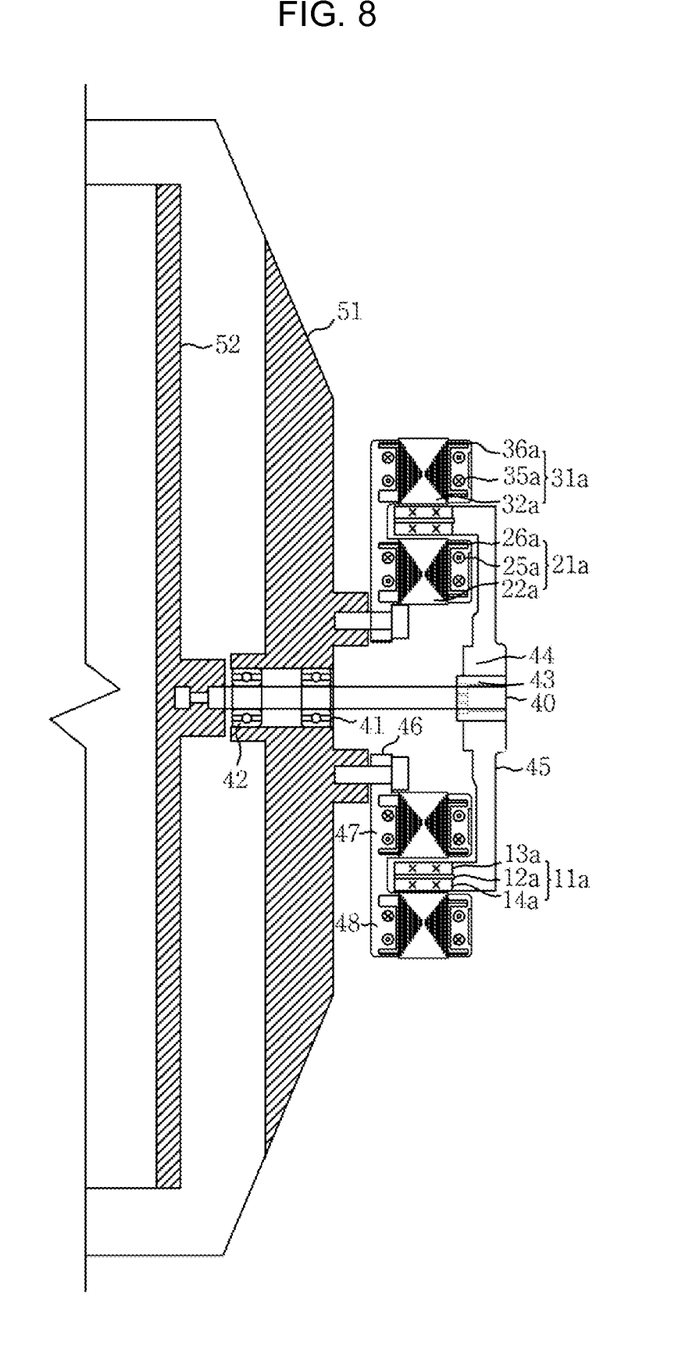
FIG. 8 is an axial cross-sectional view showing a double-stator/double-rotor type motor of a slim type structure applied to a drum-type washing machine, according to a modified embodiment of the present invention.

FIG. 8 is an axial cross-sectional view showing a double-stator/double-rotor type motor of a slim type structure applied to a drum-type washing machine, according to a modified embodiment of the present invention.

The double-stator/double-rotor type motor shown in FIG. 8 employs a slim type structure as an outer-rotor structure (or an inner-stator structure) in which the rotor 11*a* is disposed at the outer side of the motor, as shown in FIG. 7, but rotatably supports the rotatable shaft 40 in which both the first bearing 41 and the second bearing 42 are placed in the tub 51.

Meanwhile, since the components of the double-stator/double-rotor type motor shown in FIG. 8 are the same as those of the FIG. 7, the detailed description thereof will be omitted. Likewise, the detailed description of the rotor 11*a*, the inner stator 21*a* and the outer stator 31*a* will be omitted.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

INDUSTRIAL APPLICABILITY

The present invention can be applied to an inner cylinder or a drum driving apparatus for full-automatic washing machines, or cover integrated or slim type drum-type washing machines.

The invention claimed is:

1. A direct drive apparatus for a drum-type washing machine in which the direct drive apparatus is provided for a tub to thus drive a basket, the direct drive apparatus comprising:
   a rotor including a first permanent magnet mounted on an inner circumferential surface of a back yoke and a second permanent magnet mounted on an outer circumferential surface of the back yoke;
   a stator unit including an inner stator that faces the first permanent magnet with a first air gap, to generate a first magnetic field that rotates the rotor, and an outer stator that faces the second permanent magnet with a second air gap, to generate a second magnetic field that rotates the rotor, to thereby drive the rotor rotatably;
   a rotating shaft whose outer circumference is fixedly supported to a central portion of the rotor and whose front end is fixedly combined with the basket;
   a first bearing that is mounted on a central portion of the stator unit and rotatably supports one end of the rotating shaft; and
   a second bearing that is provided in the tub to thus rotatably support the other end of the rotating shaft,
   wherein the rotor is placed between the inner stator and the outer stator, to thus form an independent magnetic circuit for each of the inner stator and the outer stator to thereby perform a double-rotor function,
   wherein the stator unit further includes: an inner stator support that supports the inner stator; an outer stator support that supports the outer stator; an inner extension portion that extends inwards from the inner stator support; and an outer extension portion that extends outward from the outer stator support, and
   wherein the inner stator support, the outer stator support, the outer extension portion and the inner extension portion are integrally combined as a single piece, and only the outer extension portion is attached to the tub in such a way that the single piece forms an annular cover covering the rotor.

2. The direct drive apparatus for a drum-type washing machine according to claim 1, wherein the first and second permanent magnets of the rotor are disposed so that the magnets of an identical polarity face each other.

3. The direct drive apparatus for a drum-type washing machine according to claim 1, wherein protrusions are respectively formed on inner and outer circumferences of the back yoke in the rotor, to thus make one protrusion form a slot of a channel structure in cooperation with an adjacent protrusion, in which the first and second permanent magnets are insert and fixed into the slot in a sliding manner.

4. The direct drive apparatus for a drum-type washing machine according to claim 1, wherein the inner stator forms a plurality of outer T-shaped teeth that are protruded outwards from an annular body, and the outer stator forms a plurality of inner T-shaped teeth that are protruded inwards from the annular body, in which the number of the outer T-shaped teeth and opening angles thereof are formed differently from those of the inner T-shaped teeth, to thus minimize cogging torque and torque ripples, respectively.

5. The direct drive apparatus for a drum-type washing machine according to claim 1, wherein the inner stator and the outer stator have a split-core structure, respectively.

* * * * *